United States Patent [19]

Hayashi et al.

[11] Patent Number: 5,443,116
[45] Date of Patent: Aug. 22, 1995

[54] STACKED HEAT EXCHANGER

[75] Inventors: Masateru Hayashi; Kazuo Ishii; Akihiro Ito, all of Nishi-biwajima; Hidenao Kawai, Nagoya; Yasuhiko Hirao, Nagoya; Hiroshi Iokawa, Nagoya, all of Japan

[73] Assignee: Mitsubishi Jukogyo Kabushiki Kaisha, Tokyo, Japan

[21] Appl. No.: 113,054

[22] Filed: Aug. 25, 1993

[30] Foreign Application Priority Data

Aug. 31, 1992 [JP] Japan .................................. 4-231186
Aug. 31, 1992 [JP] Japan .................................. 4-231187
Oct. 9, 1992 [JP] Japan .................................. 4-271567

[51] Int. Cl.⁶ .............................................. F28D 1/03
[52] U.S. Cl. ................................. 165/149; 165/153
[58] Field of Search ............................. 165/149, 153

[56] References Cited

U.S. PATENT DOCUMENTS

| | | | |
|---|---|---|---|
| 4,327,802 | 5/1982 | Beldam | 165/153 |
| 4,592,414 | 6/1986 | Beasley | 165/153 |
| 5,024,269 | 6/1991 | Noguchi et al. | |
| 5,137,082 | 8/1992 | Shimoya et al. | 165/153 |
| 5,152,337 | 10/1992 | Kawakatsu et al. | 165/153 |
| 5,176,206 | 1/1993 | Nagasaka et al. | 165/153 |
| 5,307,869 | 5/1994 | Blomgren | 165/153 |

FOREIGN PATENT DOCUMENTS

| | | |
|---|---|---|
| 59-34960 | 8/1984 | Japan . |
| 61-184394 | 8/1986 | Japan . |
| 0415584A2 | 9/1990 | Japan . |
| 0497339A2 | 5/1992 | Japan . |

*Primary Examiner*—A. Michael Chambers
*Attorney, Agent, or Firm*—Arnold, White & Durkee

[57] ABSTRACT

The stacked heat exchanger of the present invention has a structure wherein grooves are brazed together to seal the external surface of the coolant passage, further grooves are brazed together to form a partition between the straight incoming and outgoing flow passages, and least one groove in the straight incoming and outgoing flow passage section which groove runs in parallel with the grooves earlier mentioned is formed on the formed plates. With this structure, drain water flows down promptly through these grooves and the splashing of the drain water into the downstream area of the heat exchanger can be prevented.

9 Claims, 19 Drawing Sheets

FIG. 18
RELATED ART
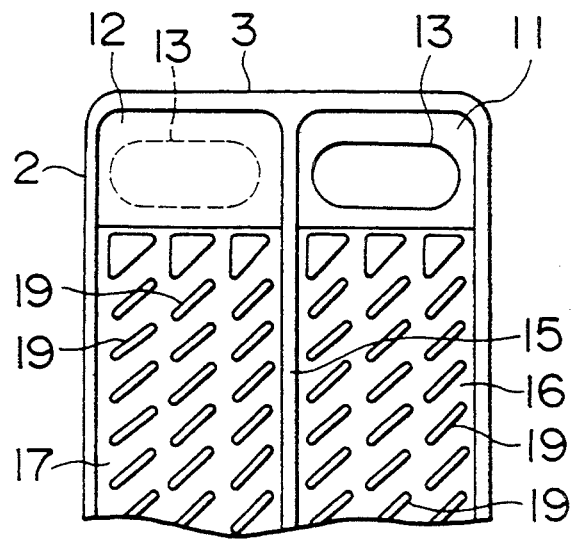
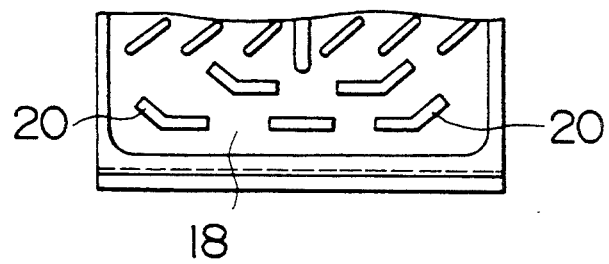

STACKED HEAT EXCHANGER

FIELD OF THE INVENTION AND RELATED ART

The present invention relates to a stacked heat exchanger which can be used as an evaporator in an air conditioners for motor vehicles and which can rapidly clear condensed water on its surface as drain water and prevent the condensed water from splashing in the downstream side of the evaporator.

A conventional stacked heat exchanger is discussed here using FIGS. 16 and 17. FIG. 16 is a side view of the conventional stacked heat exchanger, and FIG. 17 shows an enlarged longitudinal section of the right side of FIG. 16.

In FIGS. 16 and 17, flat tubes 1 are formed by butting two press-formed plates 2. At one end of the flat tubes 1 (the upper end in the figure) intake/outlet tank sections 3 are formed.

A stacked heat exchanger (evaporator) 5 is structured by alternately stacking the flat tubes 1 and corrugated fins 4 and by connecting the intake/outlet tank sections 3 to one another.

The outer sides of flat tubes 1a located at either end of the heat exchanger form the end plates 6, and through these end plates 6 there are passage holes 7 opening into the adjacent intake/outlet tank sections 3. One of these passage holes 7 is connected to an inlet pipe 8 for the fluid coolant, and the other passage hole 7 is connected to a drain pipe 9 for the coolant.

Both the inlet pipe 8 and the drain pipe 9 are attached to the end plates 6 by means of brazing. Also, corrugated fins 4 are formed between the side plates 10 and end plates 6.

The intake/outlet tank section 3 is partitioned into an intake section 11 and an outlet section 12 by a partition (not shown) that runs in the direction of the length of the panel of flat tubes 1. The intake section 11 of each intake/outlet tank section 3 communicates with the intake section 11 of the adjacent intake/outlet tank section 3 and likewise the outlet section 12 of each intake/outlet tank section 3 communicates with the adjacent outlet section 12 via communicating holes 13.

The flat tube 1 is here described in FIG. 18. FIG. 18 shows a front view of the plate 2 that constitutes the flat tube 1.

The inner hollow section of plate 2 is partitioned into two chambers 16 and 17 by a partitioning wall 15 which extends vertically. The lower end of partitioning wall 15 does not extend all the way to the bottom so that the lower end of plate 2 forms a U-turn section 18 in which the coolant makes a U-turn. By butting two of the plates 2, the partitioning wall 15 partitions the intake/outlet tank section 3 into the intake section 11 and the outlet section 12, and it further partitions chamber 16 that is a continuation of the intake section 11 and chamber 17 that is a continuation of the outlet section 12. Furthermore, chambers 16 and 17 communicate at the U-turn section 18 so that a continuous fluid passage is created by the chambers 16 and 17 and the U-turn section 18.

In chambers 16 and 17, a plurality of projections 19 are formed so that chambers 16 and 17 are further partitioned into a multitude of small maze-like passages. There are guide ribs 20 projected into the U-turn section 18 and the flow of the coolant is thereby guided through the turn from chamber 16 to chamber 17 by the guide ribs 20.

Using FIG. 20, the flow of the coolant in the aforementioned evaporator 5 is explained. FIG. 20 shows the flow path of the coolant.

The evaporator 5 is roughly divided into three groups 21, 22 and 23 (refer to FIG. 20). The inlet pipe 8 and the drain pipe 9 are connected to groups 21 and 23, and the arrangement of the intake section 11 and the outlet section 12 for these groups are identical. However, the arrangement of the intake section 11 and the outlet section 12 in group 22 is reversed.

In the intake/outlet tank sections 3 facing each other between groups 21 and 22 and again between groups 22 and 23, the outlet section 12 of group 21 communicates with the intake section 11 of group 22, and the outlet section 12 of group 22 communicates with the intake section 11 of group 23. The intake section 11 of group 21 is connected to the inlet pipe 8 by the passage hole 7 in the end plate 6. The outlet section 12 of group 23 is connected to the drain pipe 9 by the passage hole 7 in the end plate 6.

The coolant 31 that is taken into the evaporator 5 through the inlet pipe 8 is sent to the U-turn section 18 via the intake section 11 and the chamber 16 of group 21. Then it makes a U-turn at the U-turn section 18 and is sent to the outlet section 12 via chamber 17. The coolant, which is thus sent to the outlet section 12 of group 21, is then sent to the intake section 11 of group 22 and then on to group 23 by following a similar flow path as in group 21. Then it goes through the same fluid path in group 23 (chambers 16, 17, U-turn section 18) to be discharged through the drain pipe 9.

In the meantime, air 32 is supplied between corrugated fins 4, and the air 32 is cooled by the latent heat of evaporation of the coolant 31. The air path is partitioned into an upper flow and a lower flow by the flat portion of the corrugated fins 4.

Now the corrugated fins 4 are explained using FIG. 19. FIG. 19 (a) shows an enlarged view through the line A-A of FIG. 16.

A plurality of cut and raised louvers 75 are formed along the direction of the air flow (the vertical direction in the figure) in the flat portion 4a of the corrugated fins 4. The raised louvers 75 form louver groups 76 that are grouped for a fixed number of louvers and independent from each other. The incoming air in each flow path partitioned by the flat portions 4a of the corrugated finds 4 is exchanged through the raised louvers 75 between different air paths.

In the evaporator 5 described above, dehumidification occurs as the temperature of the air 32 is lowered to below its dew point temperature. Water in the air 32 condenses when the temperature becomes lower than the dew point, and water appears on the external surface of the flat tubes 1 and the internal surface of the end plates 6. Especially in the lower part of the downstream area of the air flow 32, the down-flowing condensed water tends to collect and inhibit efficient heat exchange.

Also, in the stacked heat exchanger described above, as its heat exchanging work capacity increases, the quantity of condensed water also increases.

In such a stacked heat exchanger, there is a groove formed on the external surface of flat tubes 1 by the partitioning wall 15 and this groove guides the flow of the condensed water downward. However, as this groove alone cannot always handle the quantity of flowing condensed water, there has always been likelihood of condensed water flowing onto the corrugated fins 4 and splashing downstream of the air flow due to the force of the air flow. As each of the plates 2 has a partitioning wall 15, the depth of the groove is only half the thickness of the flat tubes 1. The resulting groove, therefore, is insufficient to contain and guide down all the flowing condensed water.

Also, on the external surface of the flat tubes 1, there is a groove formed by the part of partitioning wall 15 that separates chambers 16 and 17 as described above, and the condensed water can be guided to flow down to the bottom by following this groove in the flat tubes 1. However, there is no guide groove of any sort on the inner surface of the side plate 6 for guiding the condensed water; consequently it has always been likely that some water will splash from the inner surface of side plate 6.

Furthermore, in order to improve the heat transfer efficiency, there usually are cut and raised louvers 75 formed in the corrugated fins 4 and as shown in FIG. 19(a). These raised louvers 75 are parceled into groups 76 with a specific number of louvers. However, as illustrated in FIG. 19(b), in the flat portion 4a of the corrugated fins 4, the width L of the non-louvered sections 77 becomes greater than the width l at the louver Groups 76 because of the formation of the cut and raised louvers. Therefore, contact can be made between the flat tube 1 and plate 2 only at the non-louvered sections 77, and defective brazing has been a problem since alongside the louver Groups 76 unbrazed areas occur.

OBJECT AND SUMMARY OF THE INVENTION

An objective of the present invention is to address the problems discussed above. Each aspect of the present invention solves some of the above problems but necessarily all of them at the same time.

In order to achieve this, the stacked heat exchanger of the present invention is formed by stacking a plurality of corrugated fins and a plurality of flat tubes for coolant flow, each of which is formed by joining a pair of formed plates which have a shallow dish-like section and an intake/outlet tank section for the coolant located at one end, which tank section is deeper than the shallow dish section so that the formed plate face each other, wherein a U-shaped coolant passage comprising two straight incoming and outgoing passages and a semi-circular turn passage is formed between the two joined formed plates so that the coolant flows from an intake coolant tank at said intake/outlet tank section to an outlet coolant tank at said intake/outlet tank section, wherein a corrugated plate is inserted into the straight passage;

wherein a side plate is disposed on either end in the direction of the stacking to form an outer wall; and
wherein each formed plate has a groove which is brazed together with a corresponding groove on another formed plate and seals outer periphery of the flat tubes when the formed plates are butted together, and each formed plate also has a groove which is brazed together with a corresponding groove on another formed plate and forms a partition between the two straight passages, and each formed plate also has at least one groove formed in the straight passages in parallel with any of said grooves.

With this structure, the present invention makes it possible to draw the water flow downward through the grooves promptly so that the drain water is prevented from splashing into the downstream area of the heat exchanger.

The stacked heat exchanger of the present invention is also structured in the following manner: it has flat tubes formed by butting two press-formed plates and is formed by stacking a plurality of the flat tubes and a plurality of corrugated fins alternately, wherein side plates are provided as external wall plates on both sides of the heat exchanger in the direction of the stacking, and wherein at least one groove extending vertically is provided on the inner surface of the side plates, and the back side of the groove also projects out on the outside surface of the side plates. With this structure according to the present invention, the condensed water on the inside of the side plates flows promptly down through these grooves.

As a result, no condensed water collects inside the side plates, eliminating the risk of water splashing downstream in the air current. As the grooves project on the outside as well, the structure improves the rigidity of the side plates.

Moreover, the present invention also provides a stacked heat exchanger which comprises flat tubes formed by butting two press-formed plates and is formed by stacking a plurality of such flat tubes and a plurality of corrugated fins alternately; wherein a plurality of raised louvers are formed on a flat portion of the corrugated fins 4 in the direction of air flow, so that the louvers are grouped into individual louver groups spatially separate from one another in such a manner that a non-louvered section is provided between the louver groups; wherein a partitioning groove is formed on the external surface of the flat tubes, so that the back side of the partitioning groove projects into the fluid passage in such a manner that the back side of the partitioning groove divides fluid flow within the flat tubes into an upward flow and a downward flow, and so that the non-louvered section of the corrugated fins and the partitioning groove on the flat tubes are arranged to correspond with one another.

Because of this construction according to the present invention, the wide part of the non-louvered section fits into the partitioning groove on the plate, making line contact of the plate with the non-louvered section possible and eliminating any unbrazed portions. In this way, the accuracy of brazing for the flat tubes and corrugated fins is improved, eliminating any places where defective brazing can occur. At the same time, with this partitioning groove, the water which has condensed on the surface of the flat tubes can be discharged promptly.

Furthermore, the present invention also provides a stacked heat exchanger which comprises flat tubes formed by butting together a pair of formed plates, each of which has an intake/outlet tank section for receiving and discharging fluid at one end and at least one groove that runs vertically on the external surface of a core section of the flat tubes which core section forms a passage for the fluid, and which stacked heat exchanger is formed by stacking a plurality of the flat tubes and a plurality of corrugated fins alternately stacked; wherein the groove forms a drain channel between the external surface of the flat tubes and the corrugated fins; wherein the groove is formed on one of the pair of formed plates by forming a portion indented to such a depth that the one formed plate comes in contact with the inside surface of the other formed plate at the groove.

Formed as described above, the groove for guiding the down-flowing condensed water in the present invention has a depth approximately the same as the thickness of the flat tube, and this ensures adequate channeling of the down-flowing condensed water.

Furthermore, the present invention also provides a stacked heat exchanger which comprises flat tubes formed by butting together a pair of formed plates, each of which has an intake/outlet tank section for receiving and discharging fluid at one end and at least one groove that runs vertically on the external surface of a core section of the flat tubes which core section forms a passage for the fluid, and which stacked heat exchanger is formed by stacking a plurality of the flat tubes and a plurality of corrugated fins alternately; wherein each corrugated fin is sectioned into a plurality of elements at a position of the groove, so that a drain discharge channel is formed by the groove and a space created between the elements of the corrugated fin.

With this structure according to the present invention, the problem of impediment of the down-flowing condensed water guided in the channel by the corrugated fins is eliminated.

Furthermore, the present invention also provides a stacked heat exchanger which comprises flat tubes formed by butting together a pair of formed plates, each of which has an intake/outlet tank section for receiving and discharging fluid at one end and at least one groove that runs vertically on the external surface of a core section of the flat tube which core section forms a passage for the fluid, and which stacked heat exchanger is formed by stacking a plurality of the flat tubes and a plurality of corrugated fins alternately stacked; wherein a plurality of drain channels are formed between the external surface of the flat tubes and the corrugated fins by disposing a plurality of said grooves on the flat tubes so that the width of said grooves increases from the upstream side toward the downstream side of air flow. With this structure, even when the amount of condensed water increases toward the downstream direction of the air flow, the problem of water overflowing the channel is eliminated.

BRIEF DESCRIPTION OF THE DRAWINGS

FIG. 18 shows a front view of the plates that comprise the flat tubes.

DETAILED DESCRIPTION OF PREFERRED EMBODIMENTS

Figure 1:
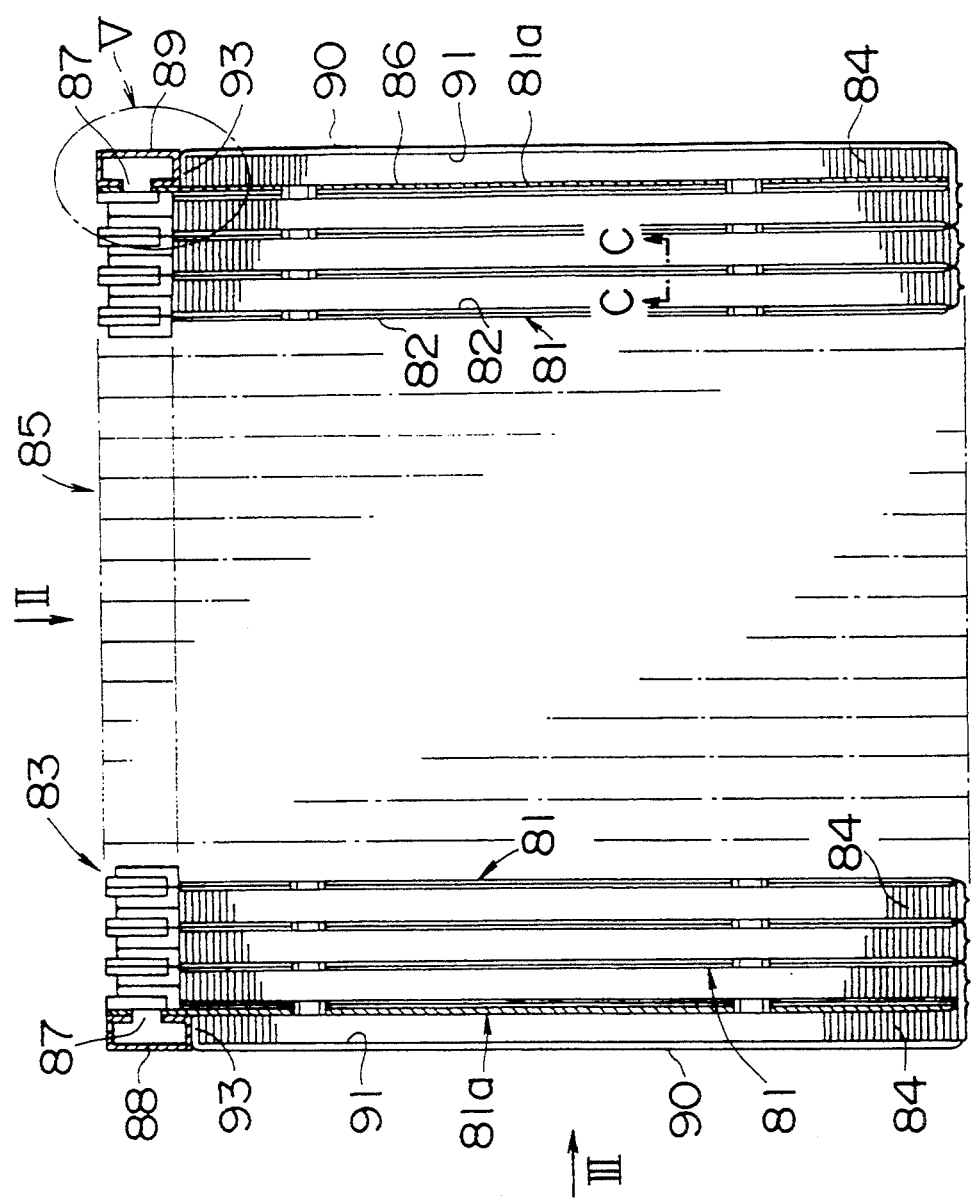
FIG. 1 is a side view of the stacked heat exchanger in an embodiment of the present invention.
Figure 2:
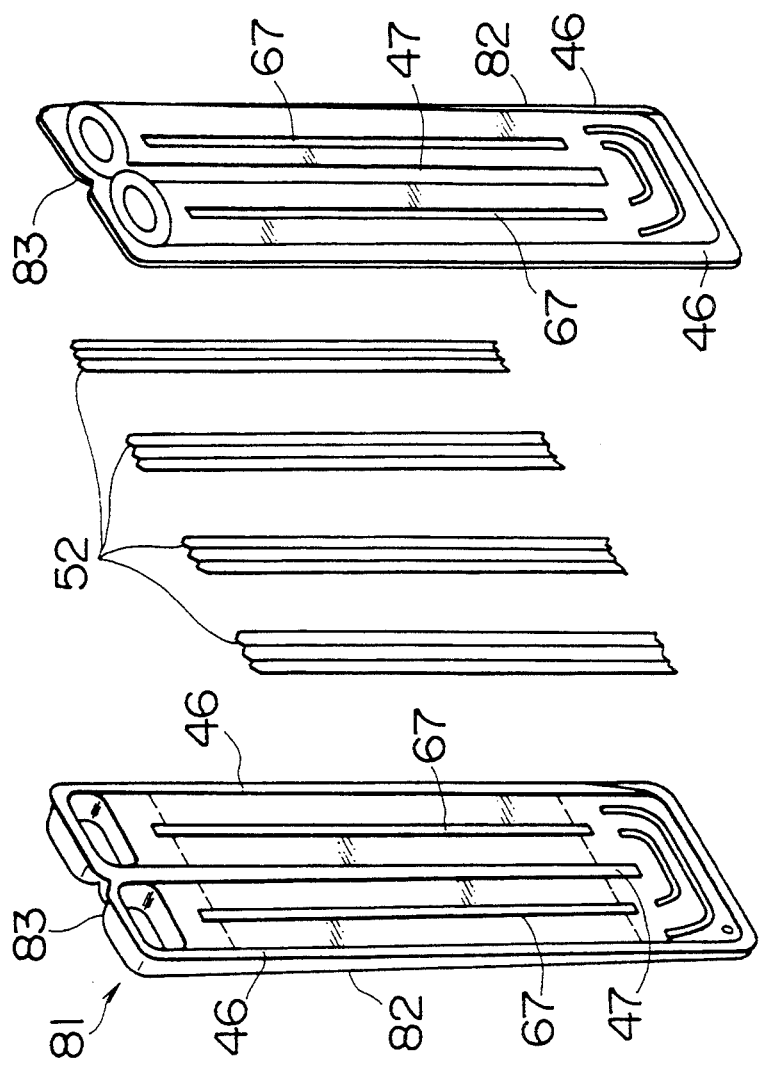
FIG. 2 is an exploded perspective view of the coolant passages used in the first embodiment of the present invention.
Figure 3:
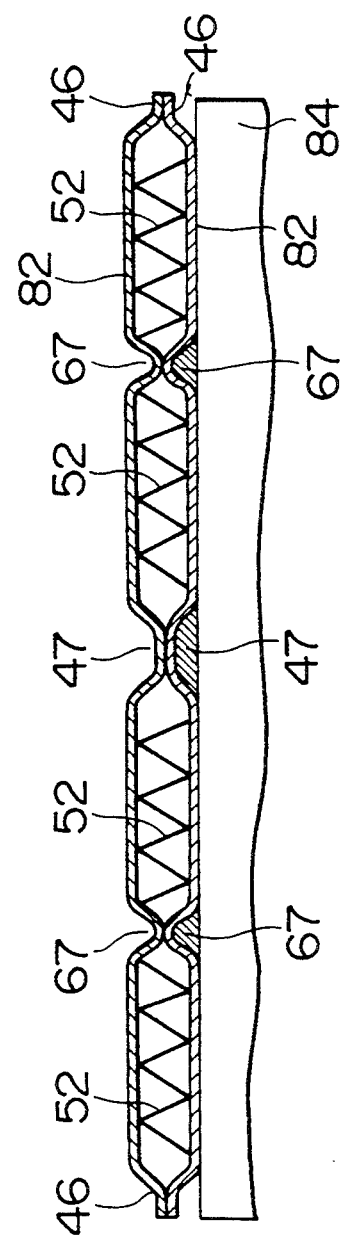
FIG. 3 is a cross-sectional view of the same coolant passages when assembled.

FIG. 1 is a side view of the stacked heat exchanger in an embodiment of the present invention. FIG. 2 is an exploded perspective view of the flat tubes, and FIG. 3 is a cross-sectional view of the flat tubes when assembled.

In these figures, the flat tubes 81 are formed by butting two press-formed plates 82. At one end of the flat tubes 81 (the upper end in FIG. 1), an intake/outlet tank section 83 is formed. The flat tubes 81 and corrugated fins 84 are alternately stacked and the intake/outlet tank sections 83 are connected so as to form the stacked heat exchanger (evaporator) 85.

At the outer sides of the flat tubes 81a that are located at either end, end plates 86 are fitted. In the end plate 86 passage holes 87 are formed through to the intake/outlet tank section 83. One of the passage holes 87 is connected with the coolant intake header 88 and the other passage hole 87 is connected with the coolant outlet header 89. On the outside of the end plates 86, there are corrugated fins 84 and side plates 90 fitted outside these fins.

Next, the structure of flat tubes 81 is explained.

In FIGS. 2 and 3, reference numeral 82 indicates a pair of formed plates, and 83 indicates the intake/outlet tank section which is formed at the top of each formed plate with grooves. Parallel grooves 47, 46, 67 are formed on the formed plates 82. The difference between this formed plate 82 and the conventional plate 2 is that the formed plate 82 of the present invention has additional grooves 67, which run parallel to the groove 15 of the conventional plate. A corrugated plate 52 is fitted in between the formed plates 82 at the time of assembly. There are four of the corrugated plates 52 in each flat tube.

In this embodiment, condensed water can flow down through the gap between grooves 46, 47 and 67 of formed plates 82 and the air-side fins 84. With this structure, the amount of condensed water running into the air-side fins is reduced, making it possible to reduce the amount of water splashing out from the backwash side of the evaporator. It should be noted that the number of the grooves 67 may be increased beyond two; there is no restriction on this.

Figure 4:
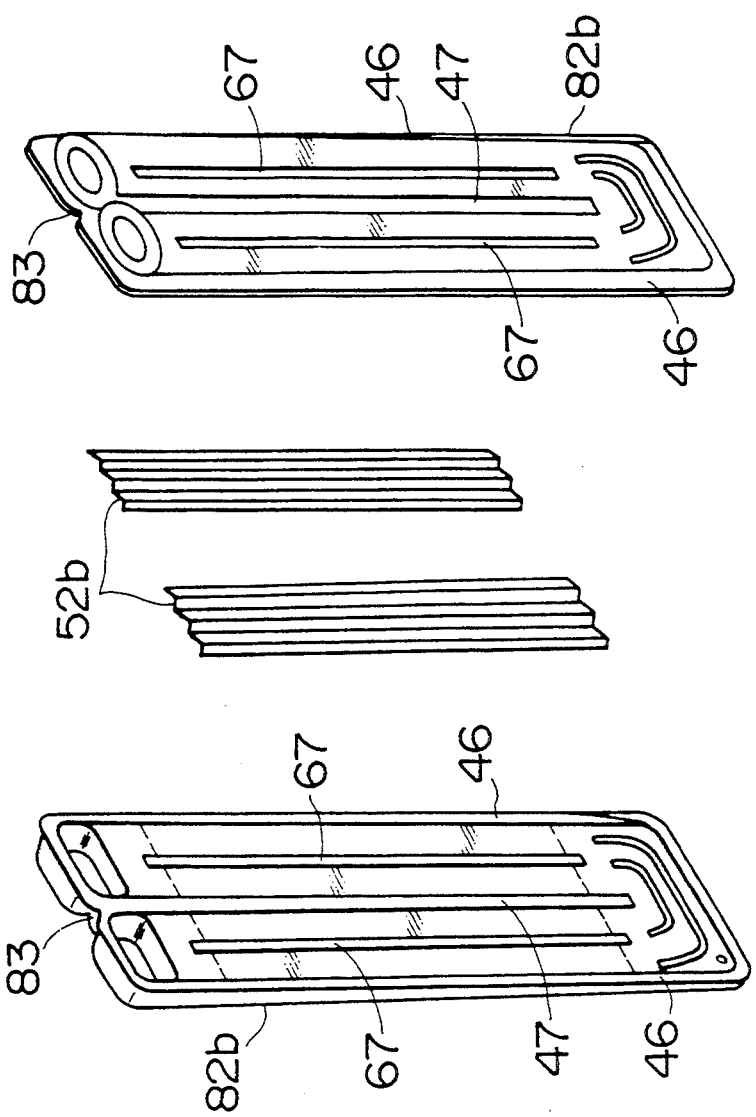
FIG. 4 is an exploded perspective view of the coolant passages used in the second embodiment of the present invention.
Figure 5:
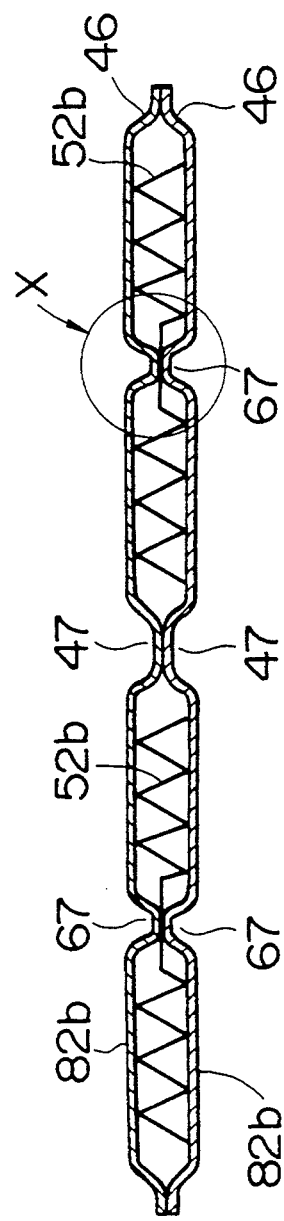
FIG. 5 is a cross-sectional view of the same coolant passages when assembled.
Figure 6:
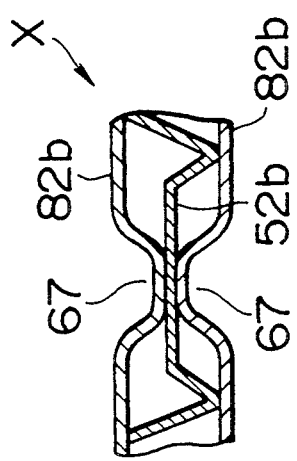
FIG. 6 is an enlarged view of the X portion of FIG. 5.

FIG. 4 is an exploded perspective view of the coolant passages used in the second embodiment of the present invention. FIG. 5 is a cross-sectional view of the same coolant passages when assembled by putting together the parts shown in FIG. 4. FIG. 6 is an enlarged view of the portion X in FIG. 5.

In these figures, a pair of formed plates 82b are approximately the equivalent of those used in the first embodiment. Parallel grooves 46, 47, 67 are formed in the formed plates 82b. Corrugated plates 52b are fitted in between the formed plates at the time of assembly. The reason there are only two corrugated plates 52b in this embodiment, although there is a total of four coolant paths incoming and outgoing, is that one corrugated plate 52b is mounted astride two coolant passages as illustrated in FIGS. 5 and 6. With this structure, the number of necessary parts is reduced. Also, it is possible to create more coolant passages by forming more grooves and to prepare and use corrugated plates that can be fitted astride more than two coolant passages to accommodate any number of passages. The function and operation of this embodiment in relation to the down flowing condensed water are the same as those in the first embodiment.

Figure 7:
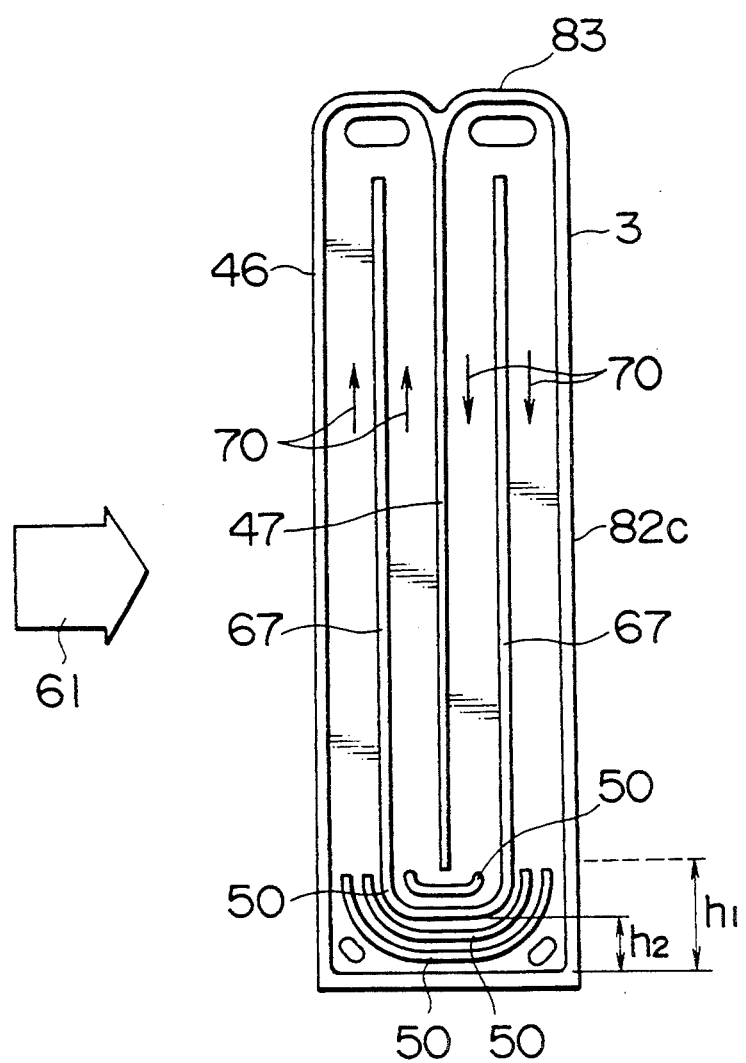
FIG. 7 is a cross-sectional view of coolant passages used in the third embodiment of the present invention.
Figure 8:
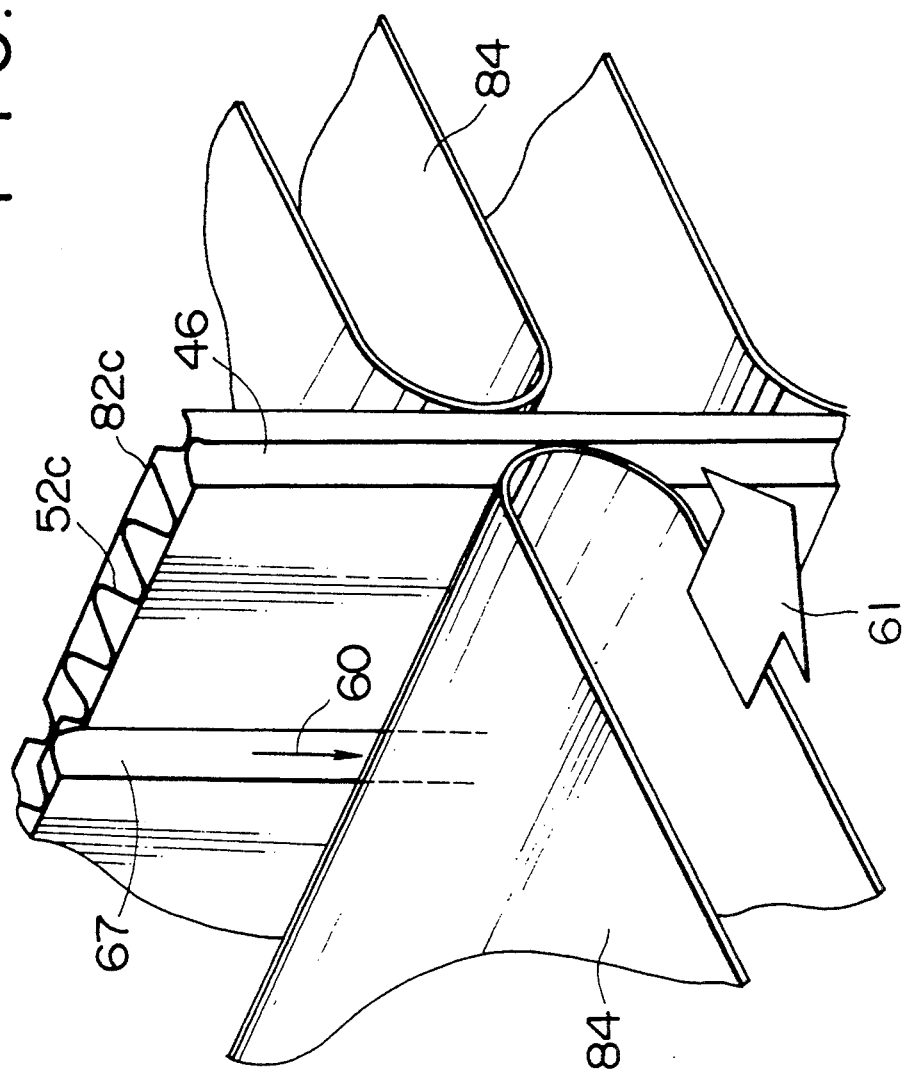
FIG. 8 is a perspective view of the same coolant passages and the air-side fins when assembled.

FIG. 7 is a longitudinal section view of the coolant passages used in the third embodiment of the present invention, and FIG. 8 is a perspective view of the same coolant passages and the air-side fins when assembled.

In these figures, reference numeral 82c denotes the formed plate, 46, 47 and 67 the grooves, 83 the tank section, 50 the coolant turn grooves for guiding the coolant through a U-turn, the arrows 70 indicate the flow direction of the coolant and the range $h_1$ is the coolant U-turn area. The difference between this formed plate and the formed plates in the first and second embodiments is that the grooves 67 on both plates are continuous with the coolant turn groove 50 through the U-turn section.

In this figure, $h_2$ indicates the range which is below the bottom of the aforementioned continuous coolant turn groove.

In FIG. 8, reference numeral 52c indicates the corrugated plates. Both the formed plates 82c and the corrugated plates 52c may be identical to those in either embodiment 1 or embodiment 2. Reference numeral 84 indicates the air-side fin, 60 the flow of the condensed water, and 61 the air flow.

In this embodiment, the condensed water 60 which is collected in the grooves 67 flows down the same grooves 67. The condensed water which has flowed down runs into one of the coolant turn grooves 50 connected to the opposite groove 67 at the coolant U-turn section and flows out onto the air-side fin 84 within the area indicated by $h_2$, which also indicates the height of the bottom of the coolant turn grooves. Part of the condensed water 60 that has flowed out this way will flow into the coolant turn groove which is located immediately below the first one and then flows out onto the next air-side fin. A similar flow will occur at the coolant turn groove which is yet one lower, making the condensed water 60 flow to an even lower position. Because of this, the entirety of the condensed water 60 flowing in the grooves 67 finally goes out onto the air-side fins 84 at the height of the lower end of the lowest coolant turn groove, thereby minimizing the chance of the condensed water 60 flowing out from the air backwash side of the evaporator. Therefore, with this embodiment, the chances of water splashing out from the rear in the backwash air flow of the evaporator are reduced.

Figure 9:
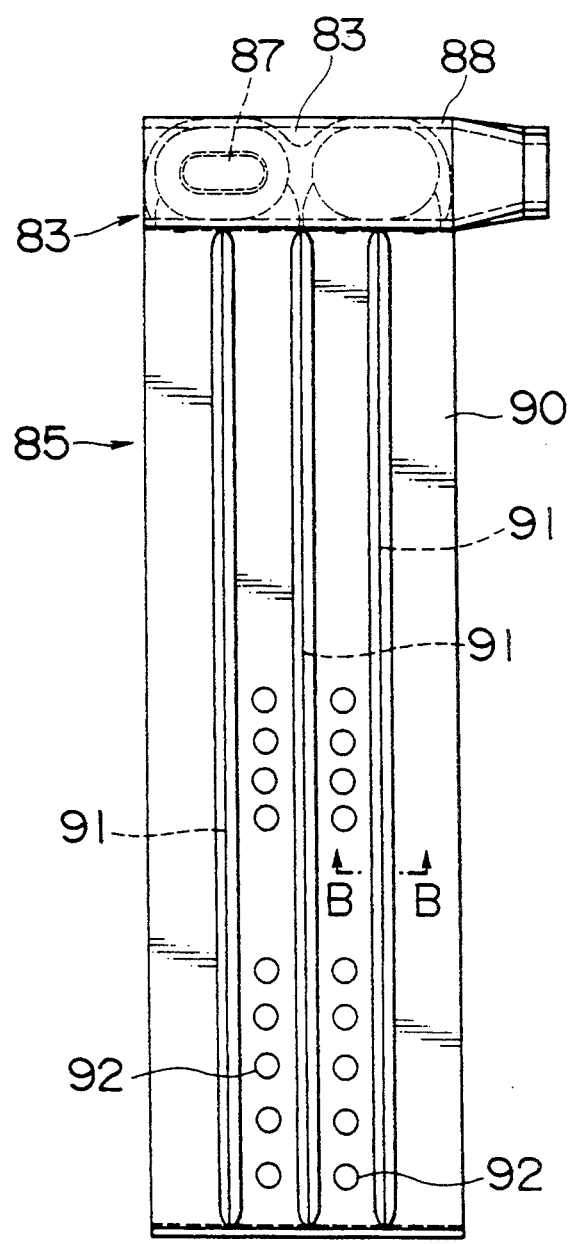
FIG. 9 is a cross-sectional view at the line indicated by arrow IV in FIG. 1.
Figure 10:
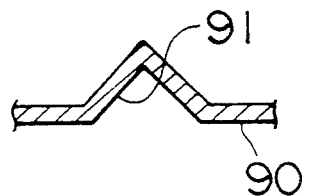
FIG. 10 is a view of line IV—IV of FIG. 9

Next the structure of the side plate 90 is explained using FIGS. 9 and 10.

FIG. 10 is a cross-sectional view along the line B—B in FIG. 9.

As shown in FIGS. 9 and 10, there are three grooves 91 formed on the inner surface of the side plate 90. These grooves 91 extend vertically and project out on the external surface. The condensed water on the inner surface of the side plate 90 flows down guided by the three grooves 91.

Also, as shown in FIG. 9, there are a plurality of through holes 92 provided, which go through the side plate 90. The diameters of these holes 92 gradually become larger toward the lower end. The condensed water on the inner surface of the side plate 90 is discharged to the outside through these through holes 92. These through holes 92 need not be round but can be elongated.

By creating grooves 91 and through holes 92 in the side plate 90, the condensed water on the inside of the side plate 90 flows down guided by the grooves and is discharged to the outside through the through holes 92. This means that the condensed water does not flow to the backwash side of the air flow.

Figure 11:
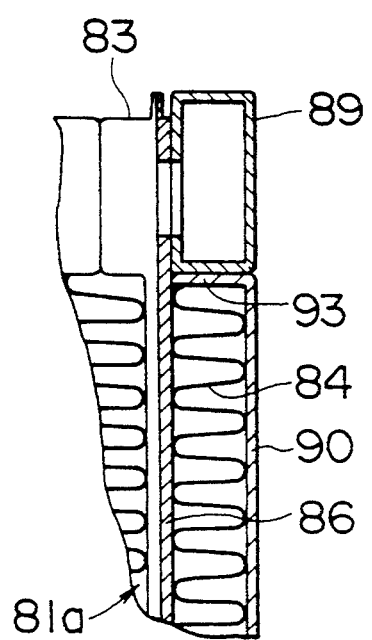
FIG. 11 is an enlarged view of the area indicated by the arrow V in FIG. 1.

The structure of the upper section of the side plate 90 is explained based on FIGS. 1 and 11. FIG. 11 shows an enlarged view of the portion indicated by arrow V in FIG. 1.

The cross section of the outlet header 89 is approximately rectangular, and the outlet header 89 is connected with passage hole 87 in the end plate 86. At the upper end of the side plate 90, the end of the horizontal section 93 is bonded to the end plate 86.

The bottom surface of the outlet header 89 and the top surface of the horizontal section 93 are aligned and are bonded by means of brazing.

Because the outlet header 89 and the side plate 90 are bonded, if pressure is applied, the force applied to the intake/outlet tank section 83 in the direction of the width is absorbed by the side plate 90, preventing deformation of the entire evaporator 85. As grooves 91 are formed on the side plate 90 and project on its outside, the side plate 90 has sufficient strength and deformation is reliably prevented.

The core section of the evaporator 85 has a larger total area of brazing because at this core section the plates 82 are joined together via the corrugated inner fins 52. This results in a large difference in strength between the intake/outlet tank section 83 and the core section. Because of this, if there is pressure applied, there is a significant difference in the amount of deformation occurring at the core section and at the intake/outlet tank section 83. However, by bonding the outlet header 89 and side plate 90, deformation can be sufficiently prevented even for the evaporator 85 which is inherently weak.

In FIG. 11, the bonded section of the outlet header 89 and the side plate.90 is shown. The intake header 88 has an identical shape as the outlet header 89 so the bonded areas with side plate 90 is exactly the same on both ends.

As the bottom surface of the intake header 88 and the outlet header 89 are bonded to the top surface of side plate 90 in the evaporator 85, any force applied to the intake/outlet tank section 83 in the direction of width when pressure is applied is absorbed by the side plate 90. Thus, deformation of the entire evaporator 85 due to the large difference in strength between the core section and the intake/outlet tank section 83 is avoided.

Furthermore, as there is no gap present between the intake header 88 and outlet header 89 and the side plate 90, there is no air leak, eliminating the problem of lowered heat exchange performance.

Figure 12:
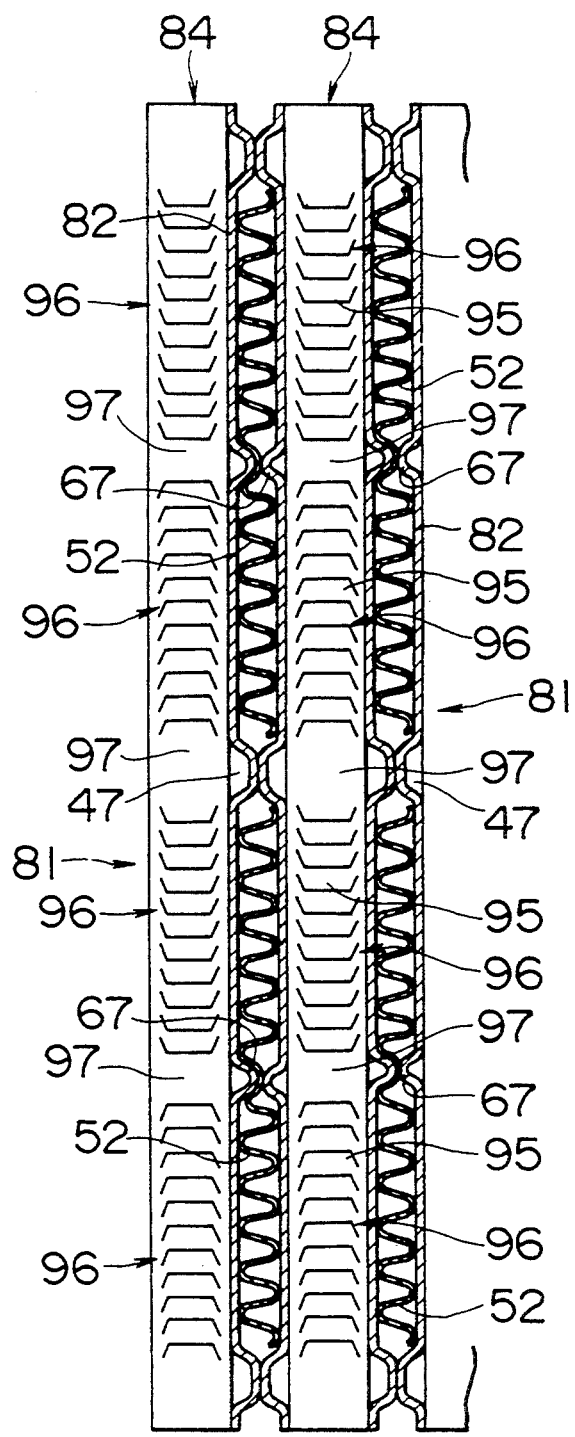
FIG. 12 is a cross-sectional view through line III—III of FIG. 1.

FIG. 12 shows a fourth embodiment and is a cross-sectional view along line C—C in FIG. 1.

As shown in FIG. 12, in the flat portion of corrugated fins 84 a plurality of cut and raised louvers are formed along the direction of air flow (vertical in the figure), and the raised louvers 95 are parceled into blocks of a specific number of louvers to form louver groups 96. Between one louver group 96 and another, there is a non-louvered section 97. Corrugated fins 84 are arranged between the flat tubes 81 in such a manner that non-louvered sections 97 correspond with the grooves 47 and 67 of the plate 82.

In the evaporator 85 of the aforementioned structure, the air flow is directed into upper and lower flow paths by the flat portion of each corrugated fin 84, and the exchange of intaken air between different air paths is achieved through passages formed at the raised louvers 95.

The width of the non-louvered sections 97 of the corrugated fins 84 is larger than the width at the louver groups 96, but as the non-louvered sections 97 are positioned at locations that correspond with the grooves 47 and 67 of the plate 82, the portions of the corrugated fins 84 where the louver groups 96 are located come in contact with the plate 82. Because of this, the contact between the corrugated fins 84 and the flat tubes 81 becomes continuous line contact, eliminating any unbrazed areas from occurring. The grooves 47 and 67 have a function of drawing promptly downward the drain water which condenses on the surface of the flat tubes 81 and the corrugated fins 84.

Figure 13:
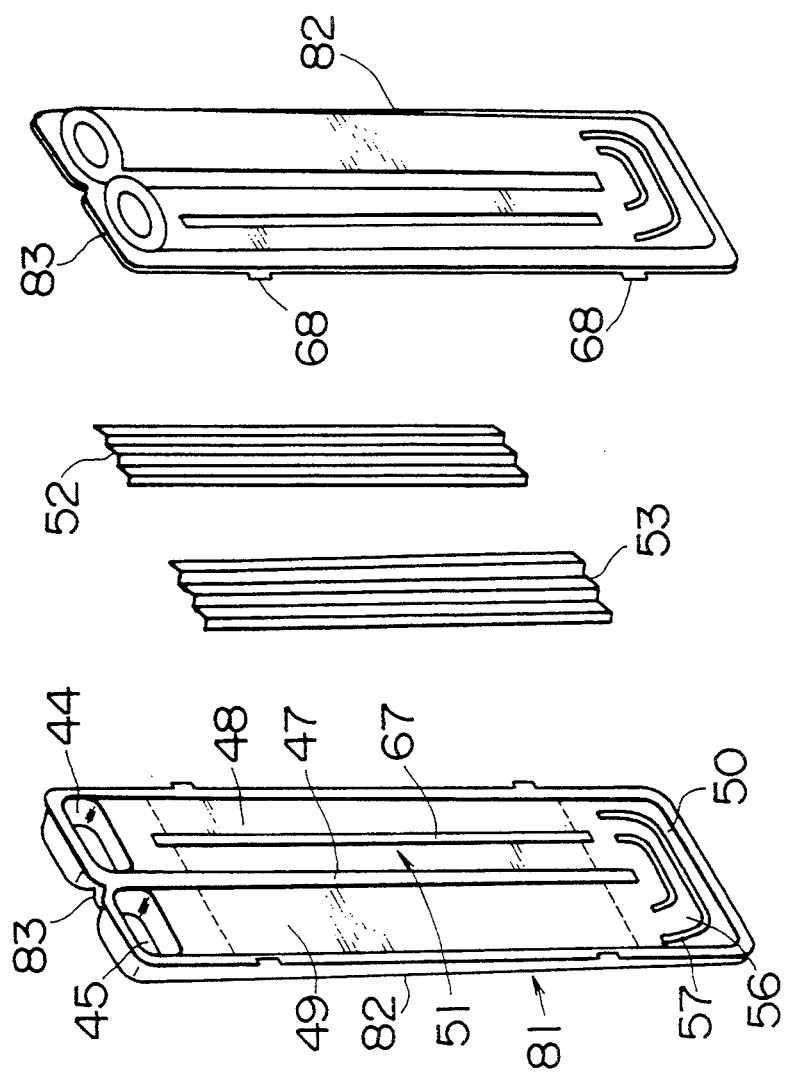
FIG. 13 is an exploded perspective view of the flat tubes.
Figure 14:
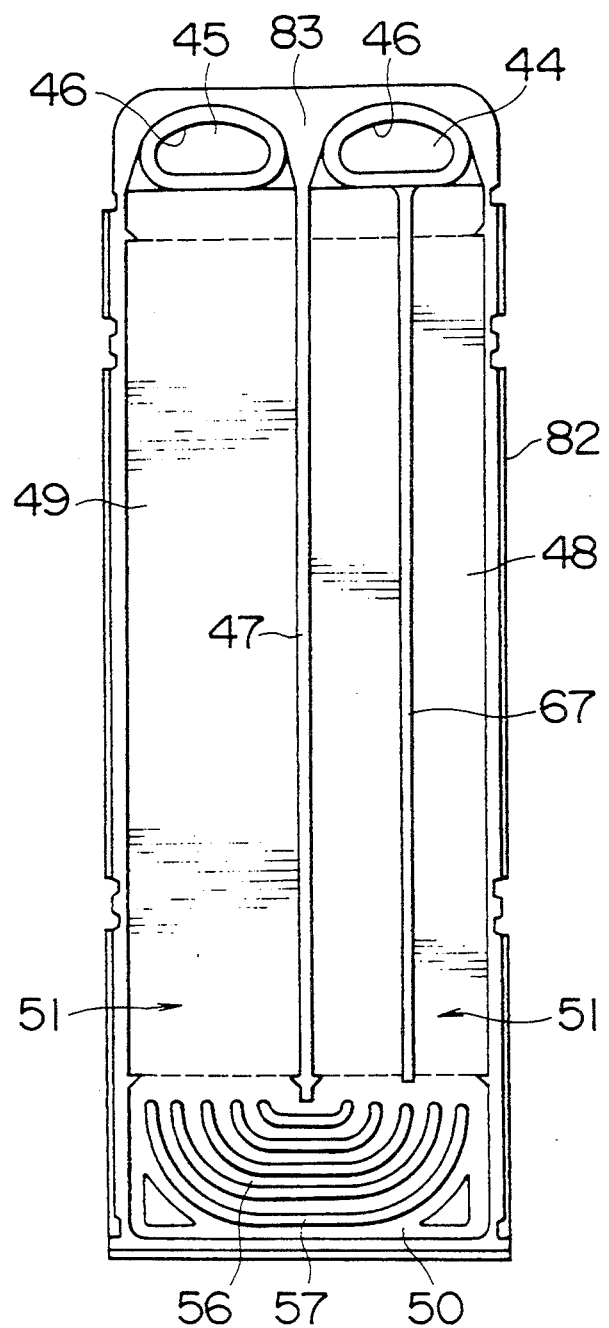
FIG. 14 is a side view of the surface of one of the butted plates forming the flat tubes.
Figure 15:
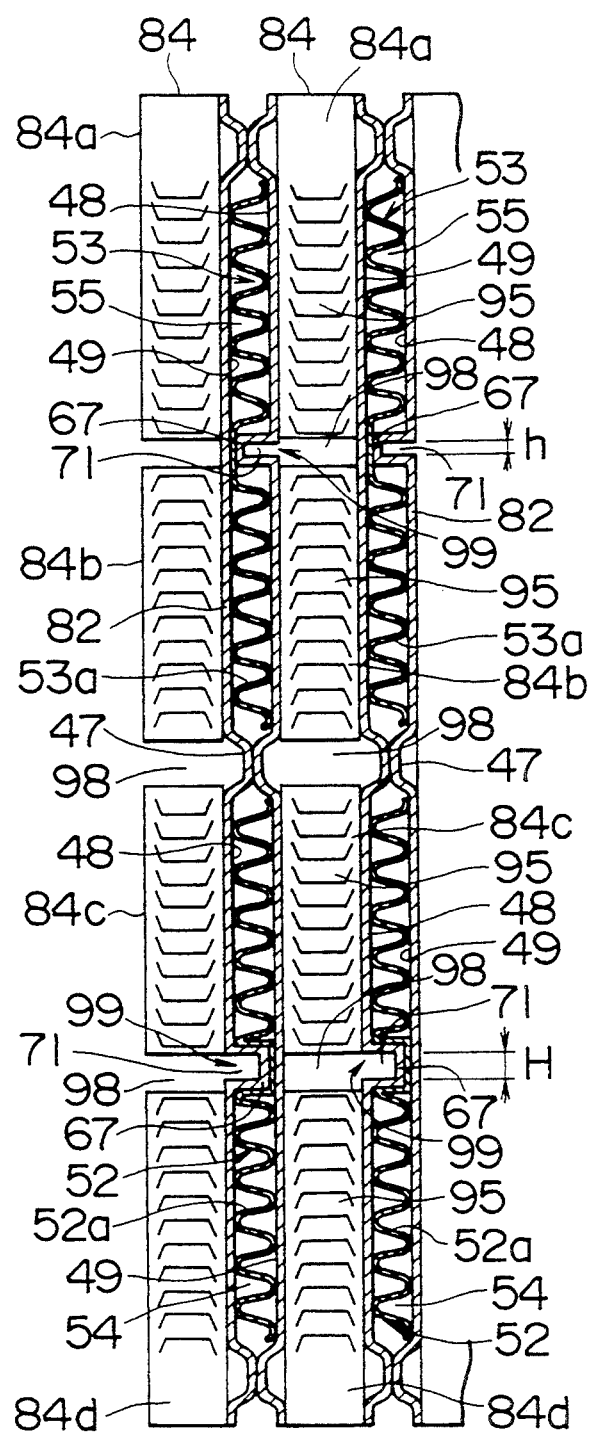
FIG. 15 is a cross-sectional view through line C—C of FIG. 1.
Figure 16:
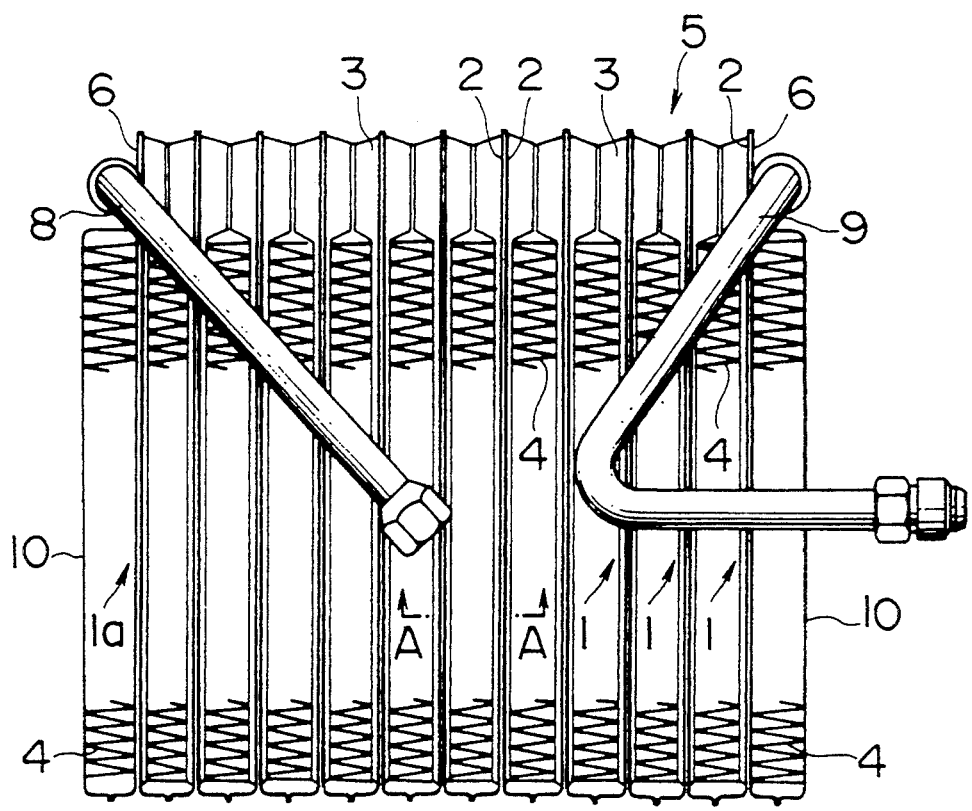
FIG. 16 shows a side view of the prior art stacked heat exchanger.
Figure 17:
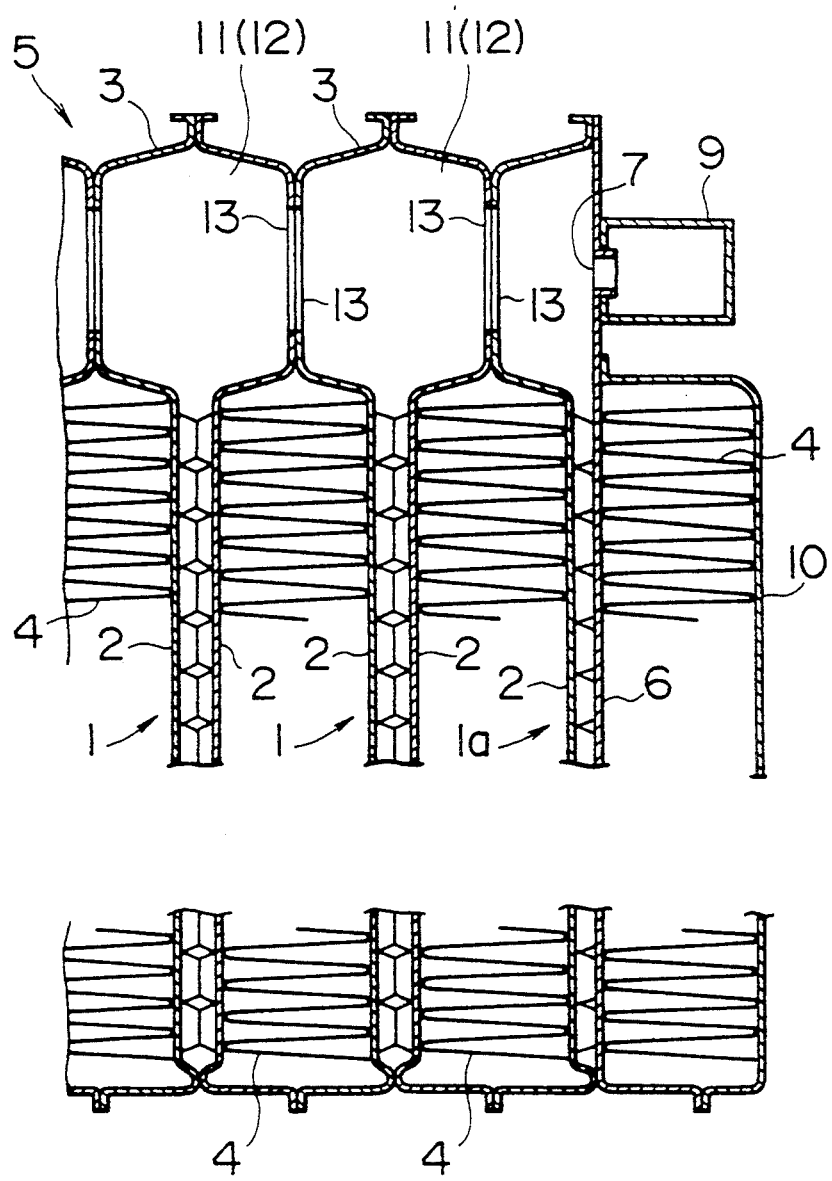
FIG. 17 shows an enlarged longitudinal cross section of the right side of FIG. 16.
Figure 19A:
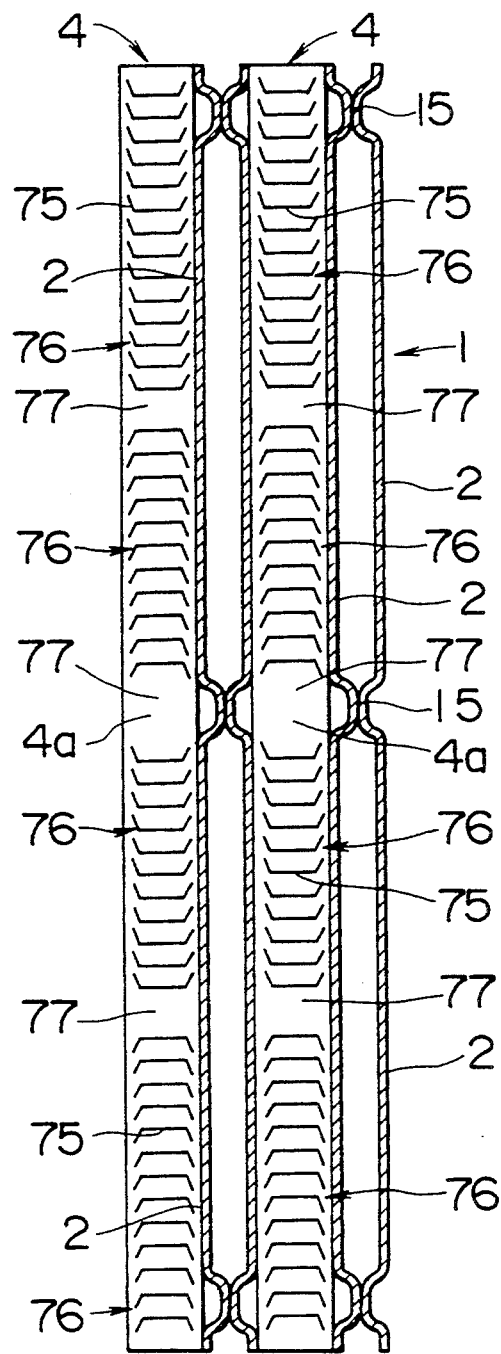
FIG. 19a is a cross-sectional view through the line A—A of FIG. 16.
Figure 19B:
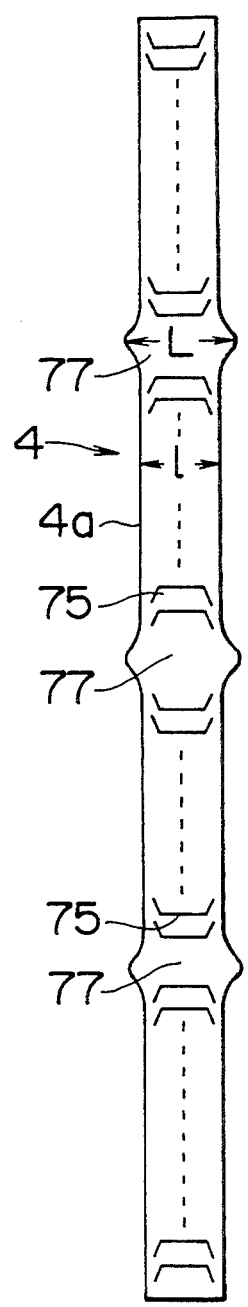
FIG. 19b is a front elevational view of the flat portion 4a of the corrugated fins 4.

FIG. 13 is an exploded perspective view of the flat tubes used in the fifth embodiment of the present invention, and FIG. 14 is a front view of the butting surface of the plates that form the flat tubes. FIG. 15 shows a cross section through the line C—C in FIG. 1.

As shown in FIG. 13, the flat tubes 81 are formed by butting two press-formed plates 82 together. At one end of the flat tubes 81 (the upper end in the figure) an intake/outlet tank section 83 is formed.

As shown in FIG. 1, the flat tubes 81 and the corrugated fins 84 are alternately stacked and the intake/outlet tank sections 83 are connected to form the stacked heat exchanger (evaporator) 85.

The intake/outlet tank section 83 is partitioned into an intake section 44 and an outlet section 45 in the direction of the width of the panel of flat tubes 81. When the evaporator 85 is assembled, the adjacent intake/outlet tank sections 83 are connected by means of communicating holes 46 in such a manner that the intake sections 44 communicate with one another and the outlet sections 45 communicate with one another.

As shown in FIGS. 13 and 14, the inner hollow section of the plate 82 is partitioned into two chambers 48 and 49 by a partitioning wall 47 which extends vertically. The lower end of partitioning wall 47 is open and the lower end of plates 82 thereby form a U-turn section 50 in which the fluid coolant makes a U-turn. By butting two plates 82 the partitioning wall 47 divides the intake/outlet tank section 83 into the intake section 44 and the outlet section 45 and it further separates the chamber 48 that extends from intake section 44 from the chamber 49 that extends from outlet section 45. Furthermore, chambers 48 and 49 communicate at the U-turn section 50, thus a fluid passage 51 is created by the chambers 48 and 49 and the U-turn section 50.

Within the chambers 48 and 49 (between the dotted lines), the corrugated inner fins 52 and 53 are inserted into the fluid passage 51. As shown in FIG. 15, in the corrugated inner fins 52 and 53, a plurality of corrugations 52a and 53a are formed along the direction of the length, so that flow paths 54 and 55 running along the direction of the length (vertically in the figure) of the chambers 48 and 49 are formed independently to divide the coolant flow into separate paths.

In the U-turn part of the fluid passage 51, a plurality of U-shaped paths 56 guide the flow of the coolant through the U-turn in independent paths. The U-shaped flow paths 56 are formed by a plurality of U-shaped beads which are press formed on the inside surface of the plates 82. The U-shaped flow paths 56 make a U shape along the shape of the plates 82.

When the coolant flows between the chambers 48 and 49, the coolant flowing in flow paths 54 and 55 located outside with respect to the width direction of the flat tubes 81 flows in the U-shaped flow paths 56 through the outside portion of the U-turn section 50. Also, the coolant flowing in flow paths 54 and 55 located inside with respect to the width direction of the flat tubes 81 flows in the U-shaped flow paths 56 through the inside part of the U-turn section 50. In other words, the coolant within the flat tubes 81 flows in the fluid passage 51 by going from inner side to inner side and from outer side to outer side.

As shown in FIGS. 13 and 15, there is provided a projection 67 in the chamber 84 of the plate 82. The projection 67 forms on the outer side of the plate 82 a groove 71 extending parallel to the partitioning wall 47. The height of the projection 67 (or the depth of the groove 71) is such that the projection 67 comes into contact with the inner surface of chamber 49 of the other plate when a pair of plates 82 are butted and joined together.

Also, as shown in FIG. 15, the width H of the groove 71, at the downstream side (lower area in the figure) of the air flow, is wider than the width h of the groove 71 at the upstream side (upper area in the figure). In other words, the flat tubes 81 are formed by butting two different types of plates 82 in which projections 67 of differing width are formed.

Furthermore, as shown in FIG. 15, the flat portion of the corrugated fins 84 has cut and raised louvers 95 formed along the direction of the air flow and the exchange of intaken air between different air paths which are partitioned vertically by the corrugated fins 84 is achieved through these raised louvers 95. The corrugated fin 84 is divided into corrugated fins 84a, 84b, 84c and 84d and aligned with the position of the grooves 71 and the projection 47 to make up the divided sections 98. The drain channel 99 is formed with the groove 71 and the back side of the projection 47 and the divided section. 98.

Figure 20:
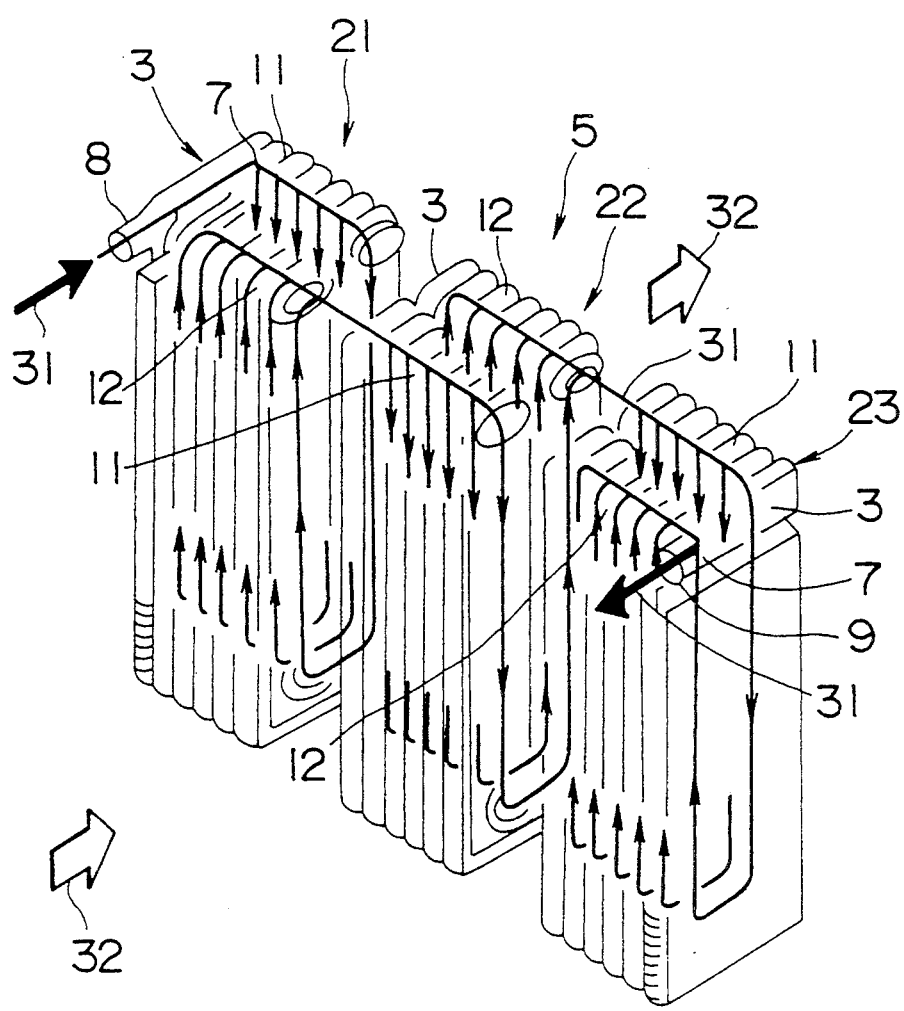
FIG. 20 shows the overall flow pattern of the coolant in the stacked heat exchanger.

In the evaporator 85 described above, the fluid coolant which flows through the intake section 44 of the flat tube 81 is guided to the U-turn section 50 via the separate flow paths 54 formed by the corrugated inner fins 52, makes a U-turn at the separate U-shaped flow paths 56 formed with the U-shaped beads 57 and then flows to the outlet section 45 via the separate flow paths 55 formed by the corrugated inner fins 53. The overall flow of coolant and air in the entire evaporator 85 wherein the flat tubes 81 and corrugated fins 84 are alternately stacked is the same as the that shown in FIG. 20.

The coolant flowing within the flat tubes 81 flows into the subdivided flow paths 54 and 55 and the U-shaped flow paths 56, which means the coolant flows in the fluid passage 51 from inside to inside and from outside to outside. This limits the separation of gas and liquid in a two phase flow of coolant that results from the centrifugal force exerted in the U-turn section 50 within the U-shaped flow paths 56. Thus, there is reduced distribution of gas and liquid in a two phase flow of coolant. Also, as the U-shaped flow paths 56 of the U-turn section 50 is U-shaped along the form of the plate 82, there is no impedance of flow of the coolant.

Because of this, distribution of gas and liquid in the coolant is reduced, so that loss of thermal efficiency due to the separation of gas and liquid is less likely. At the same time, the likelihood of occurrence of inconsistent heat exchange performance due to impedance of the coolant flow is eliminated.

While the coolant flows within the flat tubes 81, air is supplied between the corrugated fins 84 and the air is cooled by the latent heat of evaporation of the coolant.

In the aforementioned evaporator 85, as the groove 71 of the flat tubes 81 is formed in the chamber 84 of one of the plates 82 at a depth at which it fits exactly the inner surface of the chamber 49 of the other plate 82, a drain channel 99 of approximately the same depth as the thickness of flat tubes 81 is obtained.

Also, in the aforementioned evaporator 85, as the width H of the groove 71 on the downstream side of the air flow is greater than the width h of the groove 71 on the upstream side of the air flow, the condensed water does not flow out of the drain channel 99 even if the amount of condensed water increases on the downstream side of the air flow.

In the aforementioned evaporator 85, as the corrugated fins 84 are divided according to the position of the groove formed by groove 71 of the flat tubes 81 and the projection 47 and the drain channel 99 is formed with the groove formed by the groove 71 and projection 47 and the divided section 98, the condensed water flowing down is guided by the groove and is not blocked by the corrugated fins 84.

We claim:

1. A stacked heat exchanger formed by stacking a plurality of corrugated fins and a plurality of flat tubes for coolant flow, each of which is formed by joining a pair of formed plates which have a shallow dish-like section and an intake/outlet tank section for coolant located at one end, which tank section is deeper than said shallow dish section so that said formed plate face each other, wherein a U-shaped coolant passage comprising two straight incoming and outgoing passages and a semi-circular turn passage is formed between said two joined formed plates so that said coolant flows from an intake coolant tank at said intake/outlet tank section to an outlet coolant tank at said intake/outlet tank section, wherein a corrugated plate is inserted into said straight passage;

wherein a side plate is disposed on either end in the direction of stacking to form an outer wall; and wherein each formed plate has a groove which is brazed together with a corresponding groove on another formed plate and seals outer periphery of said flat tubes when said formed plates are butted together, and each formed plate also has a groove which is brazed together with a corresponding groove on another formed plate and forms a partition between said two straight passages, and each formed plate also has at least one groove for a drain channel formed in said straight passages in parallel with any of said grooves.

2. The stacked heat exchanger of claim 1 wherein a partitioning groove is formed to divide said turn flow passage section of said U-shaped coolant flow passage into a plurality of flow paths, and said at least one groove formed in said straight incoming and outgoing flow passages is formed in continuation with the partitioning groove in said turn flow passage section.

3. A stacked heat exchanger comprising a plurality of flat tubes which are formed by butting two press-formed plates and a plurality of corrugated fins, with said flat tubes and said corrugated fins being alternately stacked together;

wherein said stacked heat exchanger further comprises side plates provided as external wall plates on both sides of the stacked heat exchanger in the direction of stacking; and wherein a groove is provided extending vertically on the inner surface of said side plate and also projecting on the external surface of said side plate.

4. The stacked heat exchanger of claim 3 wherein a through hole for discharging condensed water is formed at least on a lower section of said side plates.

5. The stacked heat exchanger of claim 4 wherein a plurality of said through holes are provided.

6. A stacked heat exchanger which comprises flat tubes formed by butting two press-formed plates and which is formed by stacking a plurality of said flat tubes and a plurality of corrugated fins alternately and wherein a U-shaped fluid passage comprising two straight incoming and outgoing passages and a semi-circular turn passage if formed between said two joined formed plates;

wherein a plurality of raised louvers are formed on a flat portion of said corrugated fins in the direction of air flow, so that said louvers are grouped into individual louver groups spatially separate from one another in such a manner that a non-louvered section is provided between the louver groups;

wherein a partitioning groove is formed on the external surface of said flat tubes, so that the back side of the partitioning groove projects on the side of said U-shaped fluid passage in such a manner that the back side of said partitioning groove divides fluid flow in said flat tubes into an upward flow and a downward flow, and so that said partitioning groove on said flat tubes is arranged to correspond to the non-louvered section of said corrugated fins.

7. A stacked heat exchanger which comprises flat tubes formed by butting together a pair of formed plates, each of which has an intake/outlet tank section for receiving and discharging fluid at one end and at least one groove that runs vertically on the external surface of a core section of said flat tubes which core section forms a passage for the fluid, and which stacked heat exchanger is formed by stacking a plurality of the flat tubes and a plurality of corrugated fins alternately;

wherein said groove forms a drain channel between the external surface of said flat tubes and said corrugated fins;

wherein said groove is formed on either one of said pair of formed plates by forming a portion indented to such a depth that said one formed plate comes in contact with the inside surface of the other formed plate at said groove.

8. A stacked heat exchanger which comprises flat tubes formed by butting together a pair of formed plates, each of which has an intake/outlet tank section for receiving and discharging fluid at one end and at least one groove that runs vertically on the external surface of a core section of said flat tubes which core section forms a passage for the fluid, and which stacked heat exchanger is formed by alternately stacking a plurality of said flat tubes and a plurality of corrugated fins;

wherein each corrugated fin is sectioned at a position of said groove into a plurality of elements, so that a drain discharge channel is formed by a space formed between said elements of said corrugated fin and said groove.

9. A stacked heat exchanger which comprises flat tubes formed by butting together a pair of formed plates, each of which has an intake/outlet tank section for receiving and discharging fluid at one end and at least one groove that runs vertically on the external surface of a core section of the flat tube which core section forms a passage for the fluid, and which stacked heat exchanger is formed by stacking a plurality of the flat tubes and a plurality of corrugated fins alternately stacked;

wherein a plurality of drain channels are formed between the external surface of the flat tubes and the corrugated fins by disposing a plurality of said grooves on the flat tubes in such a manner that the width of said grooves increases from the upstream side toward the downstream side of air flow.

* * * * *